US007670129B1

(12) United States Patent
Watson

(10) Patent No.: US 7,670,129 B1
(45) Date of Patent: Mar. 2, 2010

(54) PROCESS AND APPARATUS FOR BENDING GYPSUM BOARD

(76) Inventor: John J. Watson, 104 N. 13th St., Canyon, TX (US) 79015

(*) Notice: Subject to any disclaimer, the term of this patent is extended or adjusted under 35 U.S.C. 154(b) by 364 days.

(21) Appl. No.: 11/895,576

(22) Filed: Aug. 27, 2007

(51) Int. Cl.
*B29C 53/04* (2006.01)

(52) U.S. Cl. ........................ 425/394; 425/374; 425/318

(58) Field of Classification Search ......... 425/362–365, 425/373, 374, 392, 394, 318; 156/95, 156–158, 156/285–287
See application file for complete search history.

(56) References Cited

U.S. PATENT DOCUMENTS 3,764,252 A 10/1973 Schulte
4,657,623 A * 4/1987 Wesch ........................ 156/429
5,198,052 A 3/1993 Ali
5,887,470 A * 3/1999 Mirtsch ......................... 72/57
7,014,450 B2 * 3/2006 Bergsma et al. ............. 425/373

FOREIGN PATENT DOCUMENTS

JP 02276621 A * 11/1990
JP 04353428 A * 12/1992

* cited by examiner

*Primary Examiner*—Yogendra Gupta
*Assistant Examiner*—Thu Khanh T Nguyen
(74) *Attorney, Agent, or Firm*—Norman B. Rainer

(57) ABSTRACT

Gypsum boards are bent to curved shape by placing a water dampened flat rectangular gypsum board upon a resiliently bendable panel positioned below a bender shell having a wall of arcuate cylindric contour which grips a margin of the gypsum board, and rolling the bender shell upon the gripped board to produce bending. A circular cylindrical weight rolls within the bender shell to apply compressive force upon the gypsum board during the bending process.

6 Claims, 5 Drawing Sheets

PROCESS AND APPARATUS FOR BENDING GYPSUM BOARD

BACKGROUND OF THE INVENTION

1. Field of the Invention

The present invention concerns a method for bending an initially flat gypsum board into a durably retained curvilinear shape, and further relates to equipment which may be used at a construction site to produce such bending.

2. Description of the Prior Art

Flat panels, often referred to as "drywalls" or "gypsum boards" are commonly employed in the fabrication of walls and ceilings of interior rooms of buildings. Gypsum board is a laminate structure comprising a core of gypsum sandwiched between a sheet of face paper on one side and a sheet of back paper on the opposite side. Gypsum board is manufactured by a relatively high speed continuous method wherein a slurry of calcined gypsum and various additives is mixed with more than sufficient water for hydration and setting of the gypsum. The slurry is deposited on a lower, continuously advancing paper sheet, and an upper continuously advancing paper sheet is layered over the slurry. The laminate structure is then formed into a continuous flat sheet of paper-enclosed gypsum.

In the typical process the gypsum board is made face side down. The face paper, on the bottom, is folded upward along the two longitudinal edges and folded over onto the top of the slurry along these edges. The back paper is placed-on top of the slurry, overlapping the edge portion of the face paper that is folded over onto the back side of the board. The continuous sheet is carried on a conveyor belt and rollers for a considerable distance until the gypsum core has set to a sufficient degree to permit the board to be cut into normal board lengths and transferred to high temperature drying kilns.

U.S. Pat. No. 5,198,052 to Ali discloses a method for producing a gypsum board having a decoratively shaped surface by applying embossing pressure to the board during its production and before the drying stage. However, Ali does not disclose or contemplate bending of the gypsum board.

Typical interior building construction comprises a plurality of spaced framing members referred to as studs, furring or joists. One or more layers of gypsum board of ⅜1" to ½" thickness are secured to one or each side of the framing members forming the wall or ceiling surfaces. The side edges of the gypsum boards are generally butted together over a framing member and nailed or screwed thereto with the fasteners extending through the gypsum board and into the framing members. To construct a monolithic appearing wall, the butt joints between adjacent gypsum boards are concealed by covering the joint with a reinforcing joint tape and several layers of a joint compound to cover the joint, the joint tape and the fasteners. To construct a smooth surface without ridges formed by the joint tape and compound, the gypsum board is produced with a slight taper on the face surface adjacent the longitudinal or side edges of the board. The taper results in a slight depression in the wall or ceiling surface at the joints. The depression is filled with the joint compound producing a smooth finish at the joint without a raised ridge.

In certain features of architectural design, it is sometimes desirable to be able to have curved wall panels. Also, vaulted ceilings are often sought but generally avoided because of the expense of traditional construction techniques. Curved gypsum boards, if manufacturable at a factory, would be difficult to transport damage-free to a construction site.

It is accordingly an object of the present invention to produce curved gypsum boards.

It is a further object to produce the aforesaid curved gypsum boards by a low cost process operable at a construction site.

These objects and other objects and advantages of the invention will be apparent from the following description.

SUMMARY OF THE INVENTION

The above and other beneficial objects and advantages are accomplished in accordance with the present invention by apparatus for bending gypsum board comprising:

a) a resiliently bendable panel bounded by flat upper and lower surfaces and a substantially rectangular perimeter, b) a bender shell comprised of a rigid wall of arcuate cylindric contour bounded by smooth interior and exterior concentric surfaces convexly curved rearwardly with respect to spaced apart parallel straight upper and lower front edges, and extending laterally to two spaced apart parallel curved side edges, said arcuate wall and edges defining a hollow interior region, c) gripping means for securing a leading edge of a gypsum board at a site adjacent the lower edge of said wall in association with said exterior surface, d) circular cylindrical weight means adapted to roll in planetary manner upon said interior surface, and e) an extension ramp extending forwardly of said lower edge for the purpose of positioning said weight means to begin rolling movement into said interior region.

In a further aspect of the present invention, a process for bending gypsum board is provided comprising:

a) selecting a gypsum board bounded by flat front and rear surfaces which define a substantially uniform thickness in the range of ¼" and ½", and having a rectangular perimeter with a length measured between opposed short margins of about 8 to 12 feet, and a width, measured between opposed long margins, of about 4 feet, said board having a long axis that bisects said short margins, and a short axis that bisects said long margins, b) moistening said front and rear surfaces with water, c) placing the moistened board horizontally flat upon a resiliently bendable panel resting upon a floor, d) placing upon said board a rigid bender shell having a smooth arcuate exterior surface and a hollow interior region, and placed in a manner to roll in the direction of an axis of said board, e) causing one margin of said board, considered to be a leading extremity, to be gripped by said bender shell and in contact with said arcuate exterior surface, f) rolling said bender shell upon the board while applying compressive force upon the board with minimal shear force, thereby causing said board to assume an arcuate shape in contact with said bender shell, said compressive force being applied by circular cylindrical weight means adapted to roll within said shell at a fixed distance above said board, and g) drying said arcuately shaped board while under physical restraint.

In preferred embodiments, said bender shell is of circular semi-cylindrical contour having handle means associated with at least one side edge to facilitate manual rolling movement of said bender shell.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
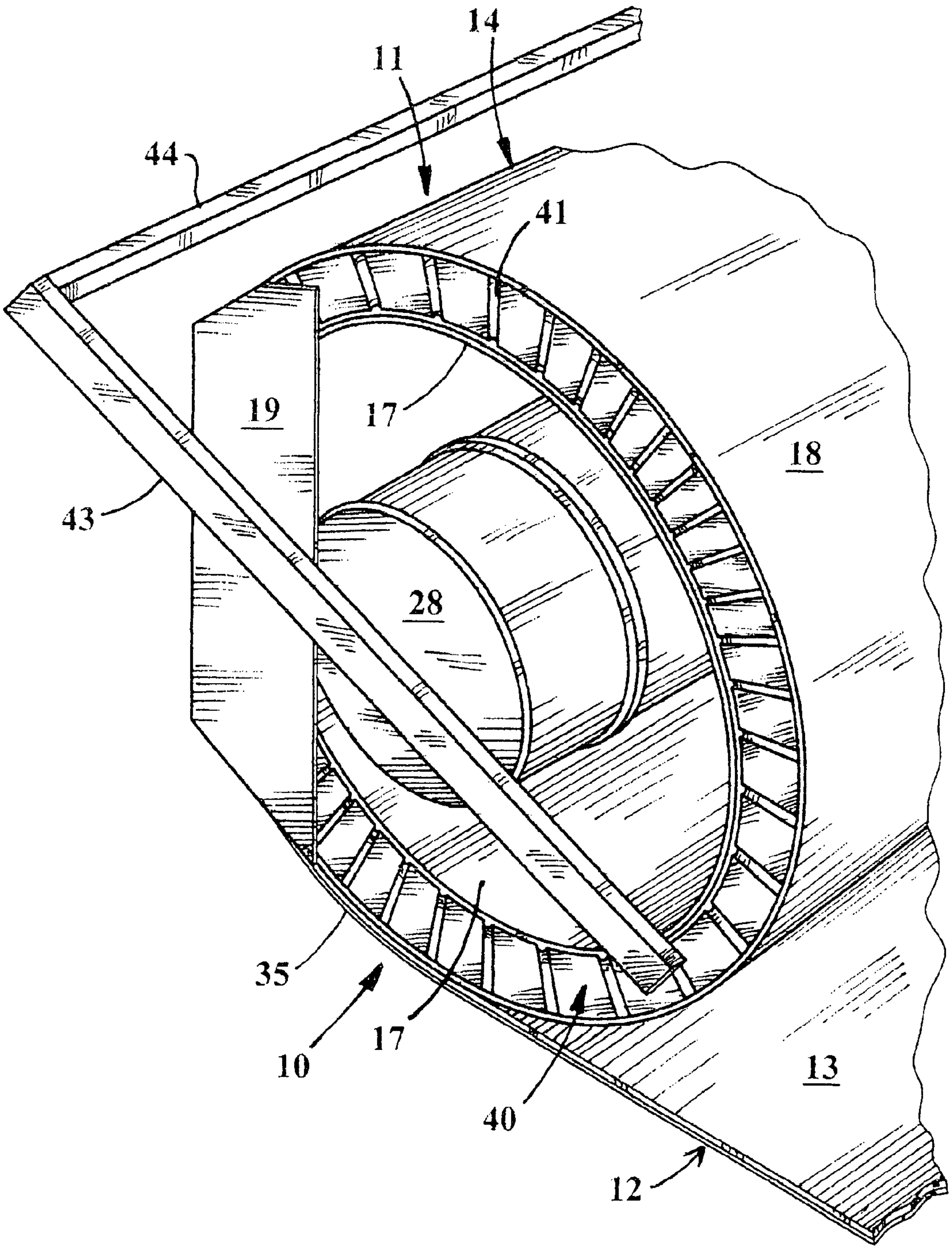
FIG. 1 is a fragmentary perspective side view of an embodiment of the apparatus of the present invention shown at the initial stage of its operation.
Figure 2:
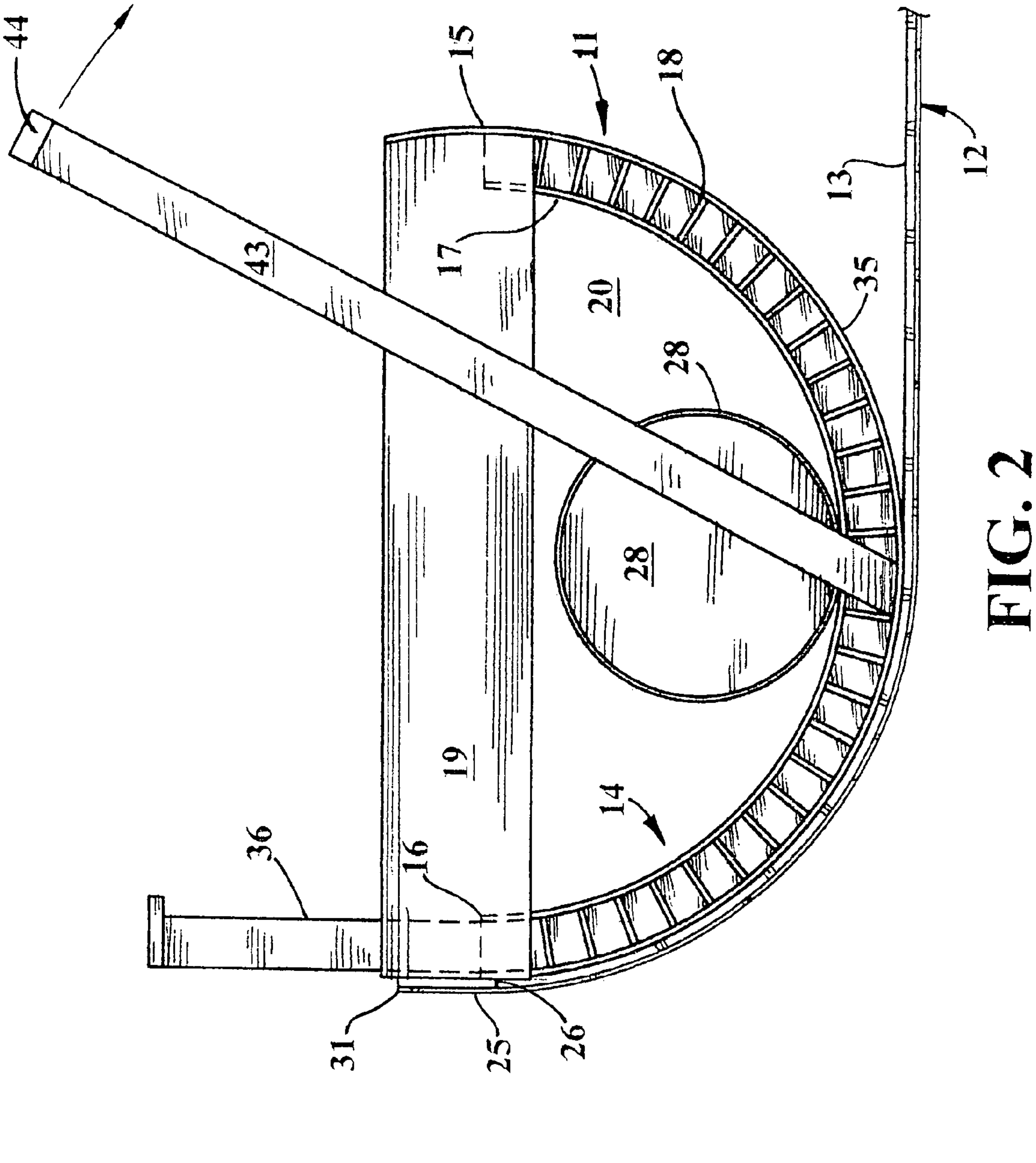
FIG. 2 is a side view of the apparatus of FIG. 1 shown at mid-stage of operation.

Referring now to FIGS. 1-6, an embodiment of the apparatus 10 of the present invention is shown comprised of bender shell 11 positioned above resiliently bendable panel 12. A gypsum board 13 is disposed between said bender shell and bendable panel.

Suitable gypsum boards are bounded by flat front and rear surfaces which define a substantially uniform thickness in the range of ¼" to ½", and have a rectangular perimeter 46 with a length measured between opposed short margins 47 of about eight to twelve feet, and a width, measured between opposed long margins 48, of about four feet. Such boards have a long axis 49 that bisects said short margins, and a short axis 50 that bisects said long margins. In the embodiment exemplified in FIGS. 1-6, the gypsum board is oriented in a manner to undergo bending in the direction of the long axis. In an alternative embodiment, the gypsum board can be oriented so as to undergo bending in the direction of the short axis.

Bender shell 11 is comprised of a rigid wall 14 shown having a substantially semi-cylindrical contour terminating in laterally spaced parallel semi-circular side edges 35, and parallel straight upper and lower front edges 15 and 16, respectively. Said lower edge tangentially merges with a flat extension ramp 36. Wall 14 is further defined by smooth interior surface 17 and concentrically located smooth outer surface 18. Said wall and edges define a rearwardly convex interior region 20. The width of wall 14 of said bender shell, measured between side edges 35, is about four feet in the illustrated embodiment designed to bend a gypsum board in the direction of its long axis. In said alternative embodiment, designed to bend the gypsum board in the direction of its short axis, the width of wall 14 is about eight feet. In the illustrated embodiment, a spacer mat 40 of movably interconnected longitudinal members 41 is disposed in intervening relationship between said interior and outer surfaces. The purpose of said spacer is to impart rigidity to wall 14.

Opposed flat sidewall panels 19 associated with said side edges add further rigidity to wall 14. Parallel operating levers 43 are joined to wall 14 and sidewall panels 19, and are forwardly connected by transverse operating handle 44. In other embodiments, wall 14 may have an arcuate cylindric contour of parabolic, ellipsoid or other non-circular shape. The wall may be fabricated of metal, laminated wood, fiberglass or other materials.

Bendable panel 12 is fabricated of sheet metal having flat upper and lower surfaces 21 and 22, respectively, and a substantially rectangular perimeter 23 of sufficient dimensions to accommodate the overlying gypsum board workpiece. Panel 12 must be resilient so as to be reversibly bendable. The thickness of panel 12 is preferably about 24 gauge and the panel terminates in its long direction by front and rear straight edges, 31 and 32, respectively.

Gripping means 25 for releasably securing the leading edge extremity 26 of gypsum board 13 is provided by the attachment of front edge 31 of bendable panel 12 to the underside of extension ramp 36 at a site adjacent the lower edge 16 of outer surface 18, Such construction causes leading edge 26 of the board to be sandwiched between extension ramp 36 and bendable panel 12.

Circular cylindrical weight means, in the form of barrel 28 is adapted to roll upon the interior surface 17 of wall 14 in a planetary manner wherein the rotational axes of the barrel and wall 14 remain parallel. The barrel, which may be of 55 gallon capacity, is filled with water at the job site. This causes the effective weight of the barrel to be about 500 pounds, thereby producing a downward force upon the gypsum board of between about 7 and 12 pounds per linear inch. The total downward force is further increased by the weight of bender shell 11, which may weigh between about 50 and 70 pounds, thereby resulting in a total downward force between about 8 and 13 pounds/linear inch. In said alternative embodiment designed to bend the gypsum board in the direction of its short axis, and wherein wall 14 has a width of about eight feet, two barrels placed end to end are caused to roll upon interior surface 17.

In the gypsum board bending process of this invention, the bendable panel is laid upon a flat floor surface at the job site. A gypsum board is moistened on both faces with water which may contain penetrating surfactants and/or agents that will cause hardening of the board upon drying.

Figure 3:
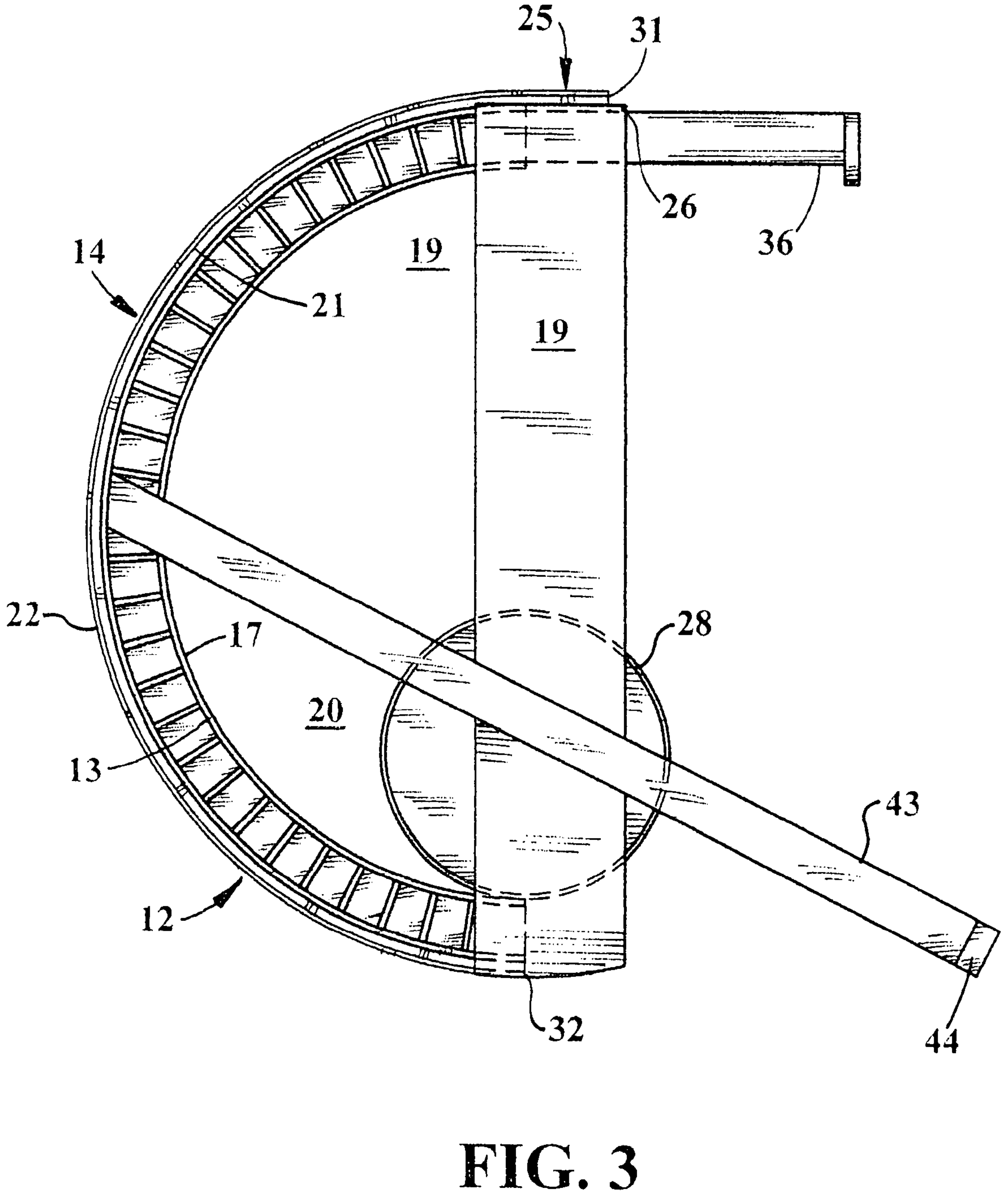
FIG. 3 is a side view of the apparatus of FIG. 1 shown at its final stage of operation.
Figure 4:
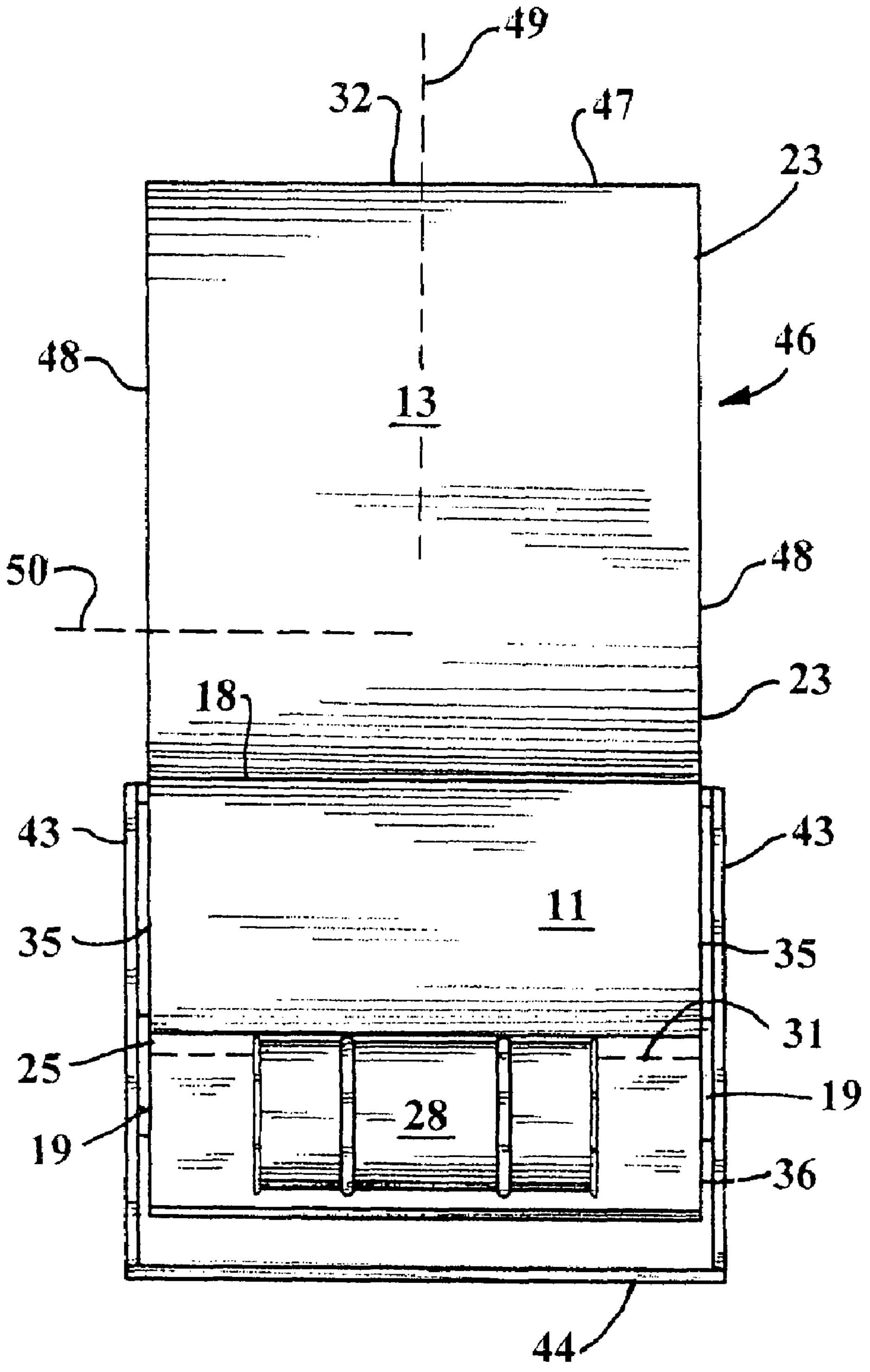
FIG. 4 is a top view of the apparatus as shown in FIG. 1.
Figure 6:
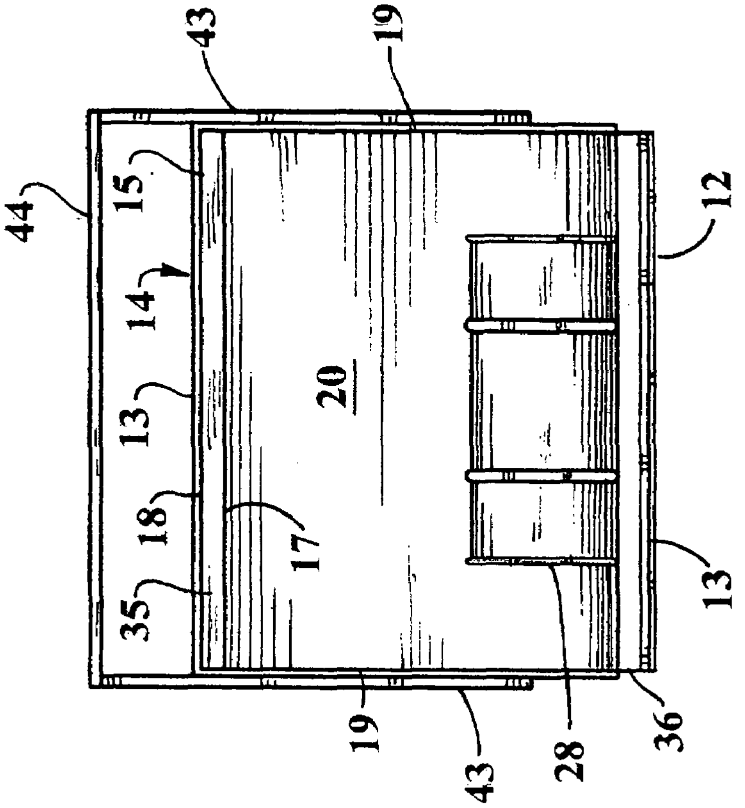
FIG. 6 is a front view of the apparatus as shown in FIG. 1.
Figure 5:
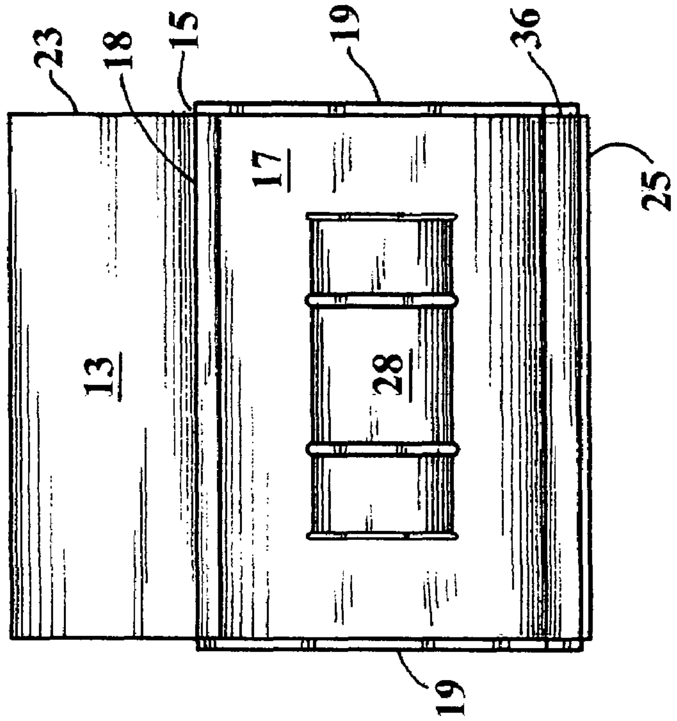
FIG. 5 is a top view of the apparatus as shown in FIG. 2.

The leading edge 26 of the moistened board is caused to be engaged by said gripping means 25 while the upper edge 15 of wall 14 is vertically above said leading edge. Barrel 28 is then entered upon interior surface 17, and slowly rolled toward rear edge 32 of bendable panel 12. The rate of movement of the drum is such that gypsum boards of 12 foot length require 3 to 6 minutes. In general, lower temperatures, and arcuate surfaces with relatively small radius of curvature require slower than average movement. When the drum reaches the rear edge 32 of panel 12 and trailing edge 50 of the board, as shown in FIG. 3, the bent gypsum board is either dried in place, employing a hand-held dryer or other drying means, or is removed while damp and placed in shape-retaining holding means for drying.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. Apparatus for bending gypsum board comprising:

a) a resiliently bendable panel bounded by flat upper and lower surfaces and a substantially rectangular perimeter, b) a bender shell comprised of a rigid wall of arcuate cylindric contour bounded by smooth interior and exterior concentric surfaces convexly curved rearwardly with respect to spaced apart parallel straight upper and lower front edges, and extending laterally to two spaced apart parallel curved side edges, said arcuate wall and edges defining a hollow interior region, c) gripping means for securing a leading edge of a gypsum board at a site adjacent the lower edge of said wall in association with said exterior surface, d) circular cylindrical weight means adapted to roll in planetary manner upon said interior surface, and e) an extension ramp extending forwardly of said lower edge for the purpose of positioning said weight means to begin rolling movement into said interior region.

2. The apparatus of claim 1 wherein spacer structure is disposed in intervening relationship between said interior and exterior surfaces to impart rigidity to said wall.

3. The apparatus of claim 2 wherein said spacer structure is comprised of a mat of movably interconnected longitudinal members.

4. The apparatus of claim 2 wherein opposed sidewall panels are associated with said side edges to add further rigidity to said wall.

5. The apparatus of claim 4 wherein parallel operating levers are joined to said wall and sidewall panels, and are forwardly connected by a transverse operating handle.

6. The apparatus of claim 1 wherein the arcuate cylindric contour of said wall is substantially an arc of a circle, and said curved side edges are substantially semi-circular.

* * * * *